United States Patent
Halachmi et al.

(10) Patent No.: US 10,595,513 B2
(45) Date of Patent: Mar. 24, 2020

(54) METHOD AND SYSTEM FOR MONITORING FOOD INTAKE OF LIVESTOCK ANIMALS

(71) Applicant: The State of Israel, Ministry of Agriculture & Rural Development, Agricultural Research Organization (ARO) (Volcani Center), Rishon-LeZion (IL)

(72) Inventors: Ilan Halachmi, Kfar-Yehoshua (IL); Ephraim Maltz, Kiryat-Ono (IL)

(73) Assignee: The State of Israel, Ministry of Agriculture & Rural Development, Agricultural Research Organization (ARO) (Volcani Center), Rishon-LeZion (IL)

( * ) Notice: Subject to any disclaimer, the term of this patent is extended or adjusted under 35 U.S.C. 154(b) by 883 days.

(21) Appl. No.: 15/102,293

(22) PCT Filed: Dec. 8, 2014

(86) PCT No.: PCT/IL2014/051071
§ 371 (c)(1),
(2) Date: Jun. 7, 2016

(87) PCT Pub. No.: WO2015/083176
PCT Pub. Date: Jun. 11, 2015

(65) Prior Publication Data
US 2017/0118961 A1 May 4, 2017

Related U.S. Application Data

(60) Provisional application No. 61/913,310, filed on Dec. 8, 2013.

(51) Int. Cl.
*A01K 29/00* (2006.01)
*A01K 11/00* (2006.01)
(Continued)

(52) U.S. Cl.
CPC ............ *A01K 29/005* (2013.01); *A01K 5/01* (2013.01); *A01K 7/06* (2013.01); *A01K 11/004* (2013.01);
(Continued)

(58) Field of Classification Search
CPC .... A01K 11/006; A01K 29/005; A01K 29/00; A01K 1/12; A01K 11/00; A01K 1/0209;
(Continued)

(56) References Cited

U.S. PATENT DOCUMENTS 5,309,864 A * 5/1994 Harmsen ............ A01K 5/0266
119/51.02
5,711,246 A * 1/1998 Yano ................... A01K 11/006
119/51.02
(Continued)

FOREIGN PATENT DOCUMENTS

CN 202565957 12/2012
CN 202773709 3/2013
(Continued)

OTHER PUBLICATIONS

Communication Pursuant to Article 94(3) EPC dated Jan. 3, 2019 From the European Patent Office Re. Application No. 14867339.5. (9 Pages).
(Continued)

*Primary Examiner* — Yvonne R Abbott-Lewis

(57) ABSTRACT

A method for monitoring food intake of livestock animals includes defining a relationship between time an animal spends at a feeding trough and the animals food intake during that time, monitoring the time an animal spends at the feeding trough and determining a quantity of food intake for the animal based on the time spent at the feeding trough and the defined relationship. Optionally, time an animal spends
(Continued)

in a feeding position at the feeding trough is monitored and used to determine quantity of food intake.

20 Claims, 5 Drawing Sheets

(51) Int. Cl.
*A01K 5/01* (2006.01)
*A01K 7/06* (2006.01)
*G06Q 10/06* (2012.01)
*G06Q 50/02* (2012.01)

(52) U.S. Cl.
CPC ....... *G06Q 10/06395* (2013.01); *G06Q 50/02* (2013.01)

(58) Field of Classification Search
CPC ........ A01K 1/0613; A01K 1/105; A01K 5/02; A01K 5/0216; A01K 5/0266; A01K 5/0275; G06Q 10/087; G06Q 10/08; G06Q 10/063; G06Q 10/06315; G06Q 10/0833; G06Q 50/02
USPC ...... 119/51.02, 174, 14.03, 51.01, 57.6, 712, 119/719, 720, 840, 842, 858, 908; 340/573.3
See application file for complete search history.

(56) References Cited

U.S. PATENT DOCUMENTS

| | | | |
|---|---|---|---|
| 6,427,627 B1 | 8/2002 | Huisma | |
| 6,651,585 B2* | 11/2003 | van den Berg | A01K 1/12 119/51.02 |
| 6,868,804 B1* | 3/2005 | Huisma | A01K 11/006 119/51.02 |
| 6,997,140 B2* | 2/2006 | Finlayson | A01K 11/00 119/840 |
| 7,296,536 B2* | 11/2007 | Umegard | A01K 1/12 119/14.03 |
| 7,370,606 B2* | 5/2008 | van der Lely | A01K 29/00 119/51.01 |
| 8,019,633 B2* | 9/2011 | Stroman | G06Q 10/063 705/7.11 |
| 8,037,846 B2* | 10/2011 | Pratt | A01K 29/00 119/174 |
| 8,282,557 B2* | 10/2012 | Haynes | A61B 8/08 119/174 |
| 9,167,800 B2* | 10/2015 | Spicola, Jr. | A01K 29/005 |
| 10,085,419 B2* | 10/2018 | Zimmerman | A01K 5/0107 |
| 10,127,747 B2* | 11/2018 | Spittle | G06Q 20/105 |
| 2008/0252464 A1 | 10/2008 | Panasevich | |
| 2012/0221250 A1 | 8/2012 | Cottle | |
| 2017/0013802 A1 | 1/2017 | Zimmerman et al. | |

FOREIGN PATENT DOCUMENTS

| | | |
|---|---|---|
| CN | 103053437 | 4/2013 |
| CN | 103065222 | 4/2013 |
| EP | 0657098 | 6/1995 |
| EP | 0673600 | 9/1995 |
| IL | 110109 | 10/1994 |
| IL | 119109 | 11/1996 |
| NZ | 581453 | 10/2011 |
| WO | WO 01/67853 | 9/2001 |
| WO | WO 2010/059161 | 5/2010 |
| WO | WO 2011/020145 | 2/2011 |
| WO | WO 2013/005038 | 1/2013 |
| WO | WO 2015/083176 | 6/2015 |
| WO | WO 2019/102471 | 5/2019 |

OTHER PUBLICATIONS

Ben Meir et al. "Eating Behavior, Milk Production, Rumination, and Digestibility Characteristics of High- and Low-Efficiency Lactating Cows Fed a Low-Roughage Diet", Journal of Dairy Science, 101: 10973-10984, Published Online Sep. 27, 2018.
Supplementary European Search Report and the European Search Opinion dated Jun. 13, 2017 From the European Patent Office Re. Application No. 14867339.5. (9 Pages).
International Search Report and the Written Opinion dated Feb. 25, 2019 From the International Searching Authority Re. Application No. PCT/IL2018/051272. (14 Pages).
Office Action dated Jan. 31, 2019 From the Israel Patent Office Re. Application No. 246138 and Its Translation Into English. (5 Pages).
Notification of Office Action and Search Report dated Jun. 19, 2018 From the State Intellectual Property Office of the People's Republic of China Re. Application No. 201480075095.1 and Its Translation Into English. (24 Pages).
Comunication Pursuant to Article 94(3) EPC dated Apr. 19, 2018 From the European Patent Office Re. Application No. 14867339.5. (7 Pages).
International Preliminary Report on Patentability dated Jun. 23, 2016 From the International Bureau of WIPO Re. Application No. PCT/IL2014/051071.
International Search Report and the Written Opinion dated Mar. 31, 2015 From the International Searching Authority Re. Application No. PCT/IL2014/051071.
Halachmi et al. "A Real-Time Control System for Individual Dairy Cow Food Intake", Computers and Electronics in Agriculture, 20(2): 131-144, Jul. 1998.
Halachmi et al. "Feed Intake of Holstein, Danish Red, and Jersey Cows in Automatic Milk Systems", Livestock Science, 138(1-3): 56-61, Jun. 2011.
Halachmi et al. "Predicting Feed Intake of the Individual Dairy Cow", Journal of Dairy Science, 87(7):2254-2267, 2004.
Maltz et al. "Effect of Feeding According to Energy Balance on Performance, Nutrient Excretion, and Feeding Behavior of Early Lactation Dairy Cows", Journal of Dairy Science, 96: 5249-5266, 2013.
Herd et al. "Reducing the Cost of Beef Production Through Genetic Improvement in Residual Feed Intake: Opportunity and Challenges to Application", Journal of Animal Science, 81(E Suppl.1): E9-E17, Jan. 2003.
Notification of Office Action dated Mar. 4, 2019 From the National Intellectual Property Administration of the People's Republic of China Re. Application No. 201480075095.1 and Its Translation Into English. (13 Pages).
Communication Pursuant to Article 94(3) EPC dated Oct. 9, 2019 From the European Patent Office Re. Application No. 14867339.5. (9 Pages).
Decision on Rejection dated Nov. 12, 2019 From the National Intellectual Property Administration of the People's Republic of China Re. Application No. 201480075095.1 and Its Translation Into English (13 Pages).

* cited by examiner

METHOD AND SYSTEM FOR MONITORING FOOD INTAKE OF LIVESTOCK ANIMALS

RELATED APPLICATIONS

This application is a National Phase of PCT Patent Application No. PCT/IL2014/051071 having International filing date of Dec. 8, 2014, which claims the benefit of priority under 35 USC § 119(e) of U.S. Provisional Patent Application No. 61/913,310 filed on Dec. 8, 2013. The contents of the above applications are all incorporated by reference as if fully set forth herein in their entirety.

FIELD AND BACKGROUND OF THE INVENTION

The present invention, in some embodiments thereof, relates to livestock management and, more particularly, but not exclusively, to monitoring food intake of cattle on an individual animal basis.

The demand for milk and meat is on a rise due to increasing population and prosperity. Simultaneously, quality and safety requirements have become stricter, and costs of raw materials, labor and energy have been rising. This trend necessitates enhancing efficiency in operational management of livestock. Various technological solutions for providing livestock with the right care and monitoring them at an individual level are being investigated.

Food intake is known to be the most costly parameter in livestock management. Therefore, farmers have a vested interest in monitoring food intake of individual animals and/or relating food intake to animal productivity. For example, isolation of a live-stock sub-population having a higher ratio of meat growth to fodder consumption, or milk production to fodder consumption may significantly affect future productivity of the livestock population. Information regarding food intake may also be useful when applying computer controlled concentrates and/or self feeders for feeding individual animals.

Israeli Patent No. 119109 entitled "A controlled automatic fodder consumption system and a method for feeding livestock using same," the contents of which is incorporated herein by reference describes a controlled fodder consumption system that provides for correlating animal identity with fodder consumption. The system includes a means for identifying individual animals in a herd, yoke gates that can be opened and closed by an automatic means, and a plurality of feeding troughs associated with a means for weighting the fodder in the troughs. Fodder consumption is determined by measuring weight of the fodder in the troughs during a feeding session and the cow's identity is correlated with the fodder consumption determined.

SUMMARY OF THE INVENTION

According to an aspect of some embodiments of the present invention there is provided a system and method for identifying an animal at a fodder trough, monitoring time spent at the fodder trough and determining fodder intake as a function of time spent at the fodder trough. According to some embodiments of the present invention, weight of the fodder at the trough is not monitor during the feeding session and fodder intake is determined absent knowledge of a change in weight of fodder in trough during a feeding session. In some exemplary embodiments, the animal is a cow.

According to an aspect of some embodiments of the present invention there is provided a method for monitoring food intake of livestock animals comprising: defining a relationship between time an animal spends at a feeding trough (or time an animal spends in a feeding position at the feeding trough) and the animals food intake during that time; monitoring the time an animal spends at the feeding trough (or the time an animal spends in a feeding position at the feeding trough); and determining a quantity of food intake for the animal based the time spent at the feeding trough (or the time spent in a feeding position at the feed trough) and the defined relationship.

Optionally, the relationship is defined by one or more lookup tables.

Optionally, the quantity of food intake of the animal is determined without weighing fodder in the feeding trough during feeding.

Optionally, the method includes determining the quantity of food intake of the animal based on time the animal spends at the feeding trough (or the time spent in a feeding position at the feed trough) and one or more additional parameters related to the animal.

Optionally, the one or more additional parameters is selected from a group of parameters including the animal's weight, milk yield, milk composition, days in milking, gender, breed, type of fodder in the feeding trough and water intake.

Optionally, water intake is defined as a function of time spent at a water trough.

Optionally, the method includes monitoring productivity of the animal and determining animal efficiency based one or more second pre-defined look-up tables or formulas relating feeding time and animal productivity with animal efficiency.

Optionally, the time the animal spends at the feeding trough is monitored by sensing opening and closing of a yoke-gate providing access to the feeding trough.

Optionally, the feeding trough is a communal feeding trough used concurrently by a plurality of animals.

Optionally, the quantity of food intake is determined based on accumulated recorded times the animal spends at the feeding trough.

Optionally, the quantity of food intake is determined concurrently for a plurality of animals by concurrently monitoring times that each of the plurality of animals spends at a feeding trough.

According to an aspect of some embodiments of the present invention there is provided a system for monitoring food intake of livestock animals comprising: a sensing unit configured for sensing time the animal spends at a feeding trough (or time the animal spends in a feeding position at the feed trough) and for identifying the animal; a computing unit storing one or more pre-defined look-up tables or formulas relating quantity of food intake of the animal to time spent at the feeding trough, wherein the computing unit is configured for receiving input from the sensing unit and determining the quantity of food intake of the animal responsive to the time spent at the feeding trough (or time the animal spent in a feeding position at the feed trough) using the one or more pre-defined look-up tables or the formulas; and a user interface configured for reporting the animal's quantity of food intake.

Optionally, the sensing unit includes a plurality of sensors.

Optionally, the sensing unit includes a camera for imaging or scanning an identity code on an identification tag fixed to an animal.

Optionally, the sensing unit includes an RFID reader for interrogating an identification tag fixed to the animal.

Optionally, the sensing unit is configured for sensing opening and closing of a yoke-gate through which the animal obtains access to the feeding trough and wherein the time the animal spends at the feeding trough (or the time the animal spends in a feeding position at the feeding trough) is defined by the duration between opening and closing of the yoke-gate by the animal.

Optionally, the sensing unit includes a microphone for sensing when the animal is eating based on sound.

Optionally, the sensing unit is operable to sense time the animal spends at a water stall.

Optionally, the computing unit is operable to receive additional input associated with the animal and to determine the quantity of food intake of the animal responsive to the time the animal spent at the feeding trough and the additional input using the one or more pre-defined look-up tables or the formulas.

Optionally, the additional input is selected from a group of parameters including: animal weight, milk yield, milk composition, days in milking, animal gender, breed, type of fodder in the feeding trough, and water intake.

Optionally, the computing unit stores one or more pre-defined second look-up tables or second formulas relating quantity of food intake of the animal to animal efficiency score.

Optionally, the animal is a cow.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to livestock management and, more particularly, but not exclusively, to monitoring food intake on an individual animal basis.

According to some embodiments of the present invention, there is provided an improved system and method for monitoring food intake of individual animals such as cows in a diary. According to some embodiments of the present invention, food intake is determined based on time that an animal spends eating and/or based on time that an animal spends at a feeding stall and/or trough. Optionally, this system and method is used in place of known methods that require monitoring weight of a feeding trough for a single animal using a weighting scale positioned below a feeding trough. The present inventors have surprisingly found that time spent at a feeding trough is highly correlated with quantity of food intake during a feeding session and can be used in place of monitored weight of the feeding trough for determining food intake. The ability to monitor food intake based on time spent in the food stall significantly reduces cost of a food intake monitoring system. The present inventors have found that a system as proposed herein provides a commercially viable option that is suitable for large scale dairy farms. According to some embodiments of the present invention, one or more sensing units installed on the food stalls identify an animal approaching a food stall and monitors time spent in the food stall. Optionally, the sensing unit includes a camera, RFID, GPS and/or other locating sensor. Optionally, parameters measured by the sensing unit are communicated to a central computing unit by remote communication.

According to some embodiments of the present invention, the central computing unit accumulates feeding times for individual animals and based on accumulated parameters monitors fodder intake of the animal and/or for evaluates efficiency of an animal. Typically, additional parameters monitored for determining fodder intake and/or animal efficiency. Exemplary parameters include the animal body weight, age, milk yield, days in milking, milk compositions, activity, breed, gender, type of fodder, season, and/or water intake. Optionally, the system additionally monitors the water intake of an animal based on time spent near a water stall and uses water intake as a parameter to determine food intake.

Figure 1:
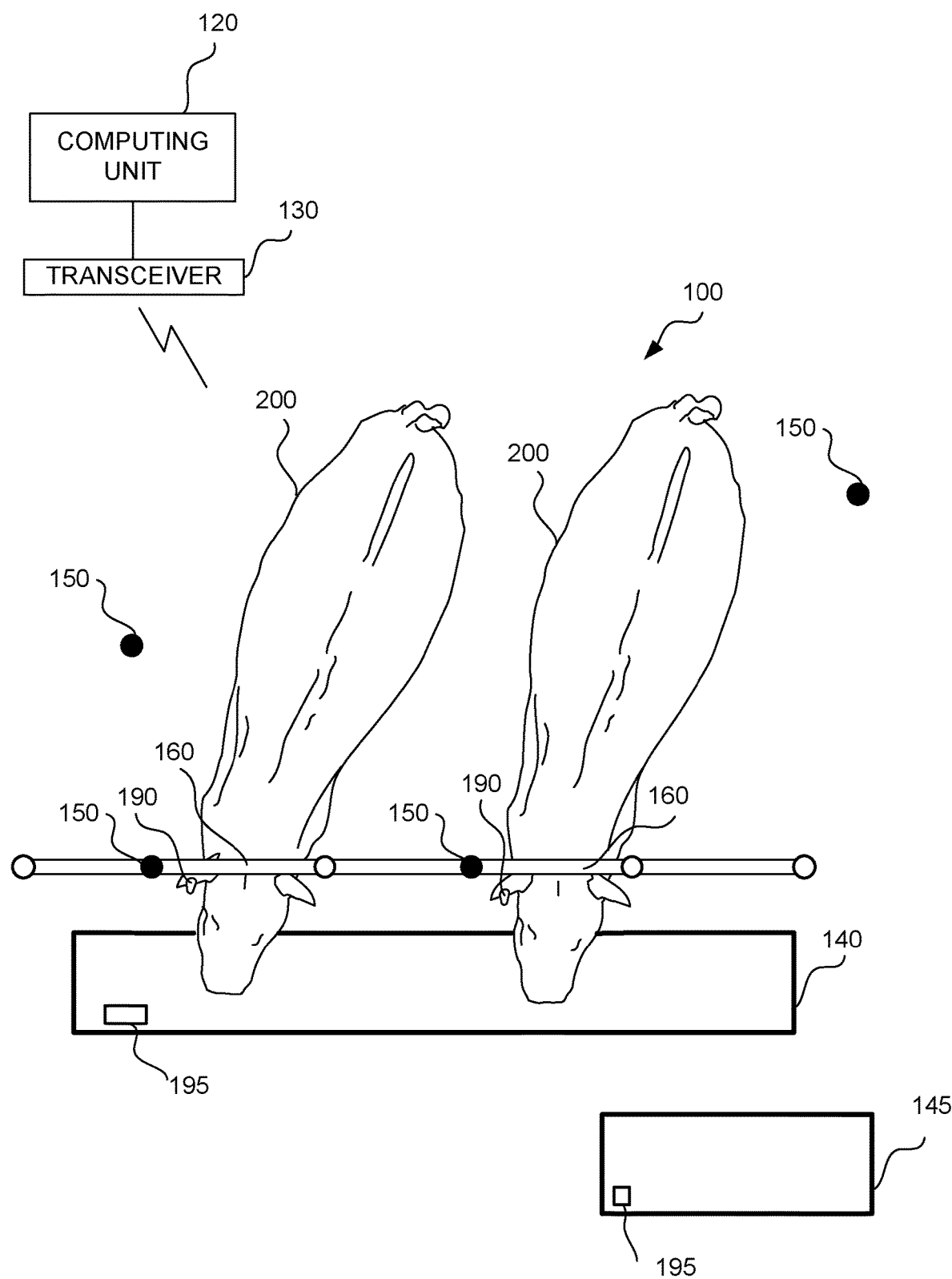
FIG. 1 is a simplified schematic drawing of an exemplary food intake monitoring system in accordance with some embodiments of the present invention.

Reference is now made to FIG. 1 showing a simplified schematic drawing of an exemplary food intake monitoring system in accordance with some embodiments of the present invention. According to some embodiments of the present invention, a system for monitoring food intake of livestock animals 100 includes one or more sensing units 150 for identifying an animal 200 and monitoring time spent at feeding trough 140 and a computing unit 120 for determining food intake of one or more individual animals based on time spent at feeding trough 140. Optionally, additional information associated animal 200 and/or stored in computing unit 120 is used to determine food intake of animal 200. According to some embodiments of the present invention, computing unit 120 includes memory capability for storing one or more pre-defined look-up tables and/or formulas e.g. a polynomial for determining fodder intake based on monitored feeding times. Typically, the tables and/or formulas are based on empirical data.

Optionally, tables and/or formulas are defined for a particular animal, breed and/or a particular fodder type.

According to some embodiments of the present invention, animal 200 approaching a feeding stall and/or fodder trough 140 is identified by a sensing unit 150. According to some embodiments of the present invention, sensing unit 150 includes one or more sensors for identifying animal 200 and monitoring time spent at feeding trough 140 and/or at a feeding position near feeding trough 140. Typically, sensor 150 includes a clock and/or a timer for recording timings and/or durations of feeding sessions.

According to some embodiments of the presented invention, data collected from individual animals 200 is transmitted to a central computing unit 120 where the data for individual animals is accumulated over time and food intake, e.g. daily food intake is determined based on the data accumulated. In some exemplary embodiments, sensing units 150 include processing and/or memory capability. Optionally, communication between sensing units 150 and central computing unit 120 is via wireless transceiver and/or receiver 130.

An animal 200, e.g. a cow includes an identity tag 190 that can be read by sensing unit 150. In some exemplary embodiments, identity tag 190 includes an identity number, e.g. hand written number and/or barcode identifying animal 200 and sensing unit 150 includes a camera that captures an image and/or scans tag 190. In other embodiments of the present invention, identity tag 190 is an electronic tag, e.g. RFID tag and sensing unit includes a reader for interrogating the electronic tag. It is noted that although in FIG. 1 tag 190 is positioned externally on an animal's ear, tag 190 can be position in other locations on animal 200 and/or may be implanted in animal 200, e.g. subcutaneous implant.

Optionally, tag 190 includes additional information associated with an identity number of the animal 200, e.g. daily weight, activity, milk yield etc. Optionally, any additional information stored in tag 190 is also communicated to sensing unit 150 and/or computing unit 120. Optionally, an animal 200 includes more than one tag 190, e.g. an identity tag, an activity monitoring tag, a temperature monitoring tag. In some exemplary embodiments, sensing unit 150 includes a camera for capturing an image of animal 200 and also includes additional sensors for sensing information stored in an electronic tag 190 of animal 200. Optionally, sensing unit 150 additionally includes a microphone for recording sounds that can be used to monitor when an animal is chewing.

According to some embodiments of the present invention, sensing unit 150 is associated with a particular feeding trough 140 and/or a particular yoke-gate 160 of a feeding trough 140. In some exemplary embodiments, sensing unit 150 is prompted to sense identity of animal 200 and/or monitor time at feeding trough 140 responsive to animal 200 pushing through yoke-gate 160 to reach fodder at feeding trough 140.

Optionally, sensing unit 150 includes a contact switch for sensing opening and closing of the yoke-gate. Optionally, sensing unit 150 is integrated with yoke gate 160 and determines time at feeding trough 140 based on opening and closing times of yoke-age 160. In some exemplary embodiments, yoke-gate 160 is a virtual yoke gate in the form of a light beam that is intercepted by an animal 200. Optionally, interception of the light beam, prompts identifying animal 200 and monitoring feeding duration.

In some exemplary embodiments, sensing unit 150 is operable to identify and monitor feeding durations of more than one animal 200 at a time. Optionally, sensing unit 150 is a global positioning type system (GPS) that can tracks position of animals 200 in relation to feeding troughs 140 and monitors time spent at these locations.

Optionally, triangulation is used to track position of animals 200.

Optionally, yoke-gates 160 are not used and animals 200 have free access to feeding troughs 140. Feeding trough 140 may be an individual food stall for a single animal 200 or a feeding trough 140 that is shared by more than one animal 200. In some exemplary embodiments, feeding troughs 140 include an identity tag, identity code, and/or identity number 195 that is tracked by sensing unit 150. Optionally, the type of feed provided in each feeding trough 140 at a particular time is stored in association with identity code 195. In some exemplary embodiments, sensing unit 150 additionally senses time that animal 200 spends in a water trough 145 and identity code 195 is used to differentiate between a feeding trough 140 and a water trough 145.

Figure 2:
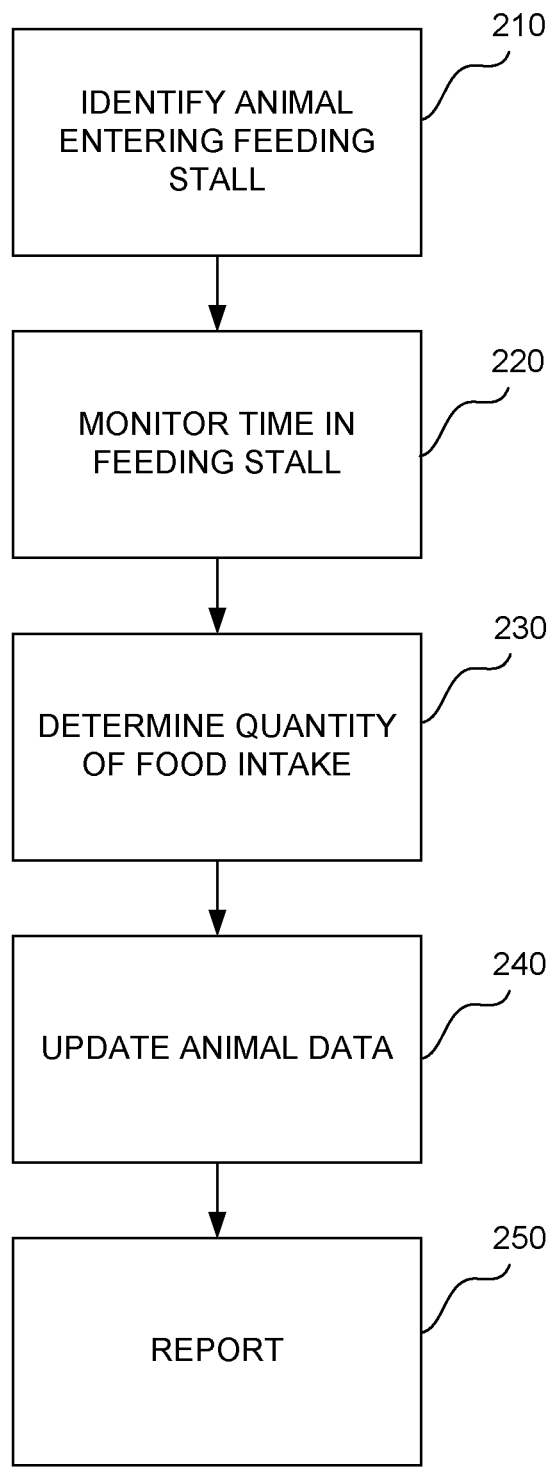
FIG. 2 is a simplified flow chart of an exemplary method for monitoring quantity of food intake in accordance with some embodiments of the present invention.

Reference is now made to FIG. 2 showing a simplified flow chart of an exemplary method for monitoring quantity of food intake in accordance with some embodiments of the present invention. According to some embodiments of the present invention, the method includes identifying an animal entering and/or approaching a feeding stall (block 210). Typically, the animal is identified using one or more sensors positioned in the housing area of the animals. Optionally, more than one animal approaches a feeding trough at a time and the stylus provides for identifying each of the animals. According to some embodiments of the present invention, time spent at the feeding trough and/or time that an animal spends in a feeding position, e.g. in a head down position near the feeding trough is monitored (block 220). Optionally, in a premise that require an animal to open a yoke-gate to gain access to a feeding trough, a duration over which an animal holds a yoke-gate open is monitored to determine time spent at the feeding trough.

According to some embodiments of the present invention, quantity of food intake is determined based on time spent at the feeding trough using one or more look-up tables and/or pre-defined formulas (block 230). In some exemplary embodiments, quantity of food intake is determined per feeding session. Alternatively and/or additionally, quantity of food intake is determined based on accumulated data over a plurality of feeding sessions, e.g. a day, week and/or month. According to some embodiments of the present invention, time in the food stall and/or feeding time are one out of a plurality of parameters based on which food intake is determined. Optionally, the plurality of parameters include for example time spent near water trough, age, body weight, breed, milk yield, days in milking. According to some embodiments of the present invention, the quantity of food intake for a particular animal and/or for each of a plurality of animals is reported (block 250).

Figure 3:
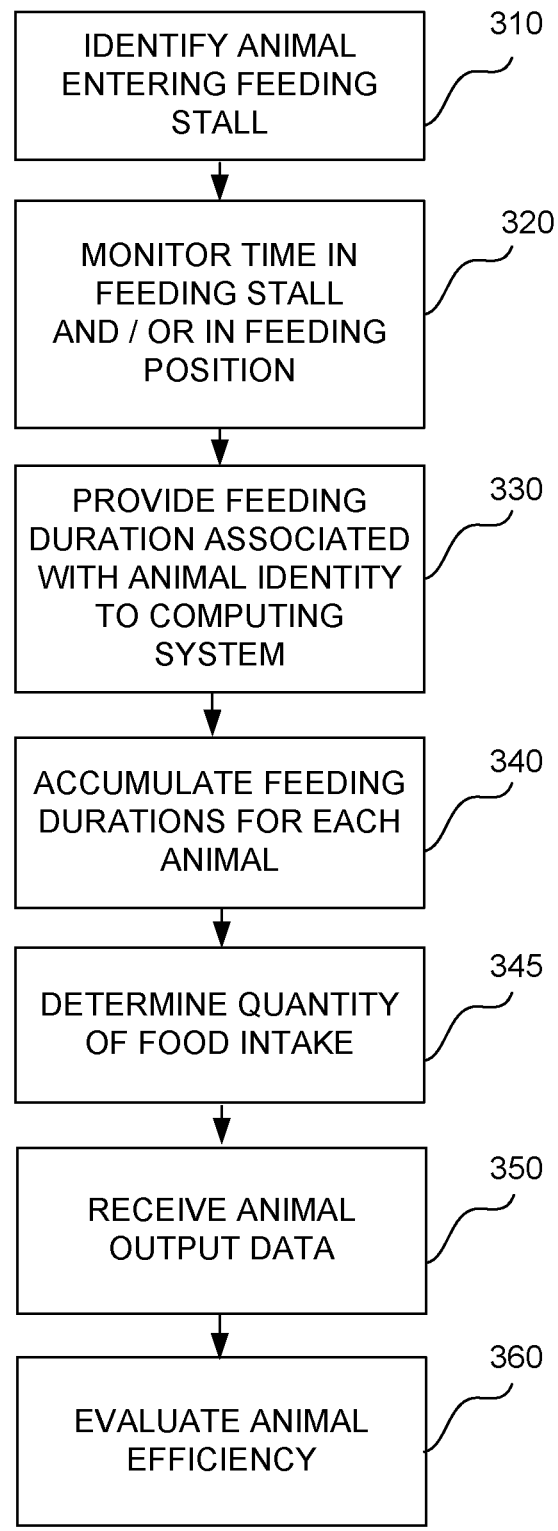
FIG. 3 is a simplified flow chart of an exemplary method for evaluating efficiency of animal based on accumulated feeding times in accordance with some embodiments of the present invention.

Reference is now made to FIG. 3 showing a simplified flow chart of an exemplary method for evaluating efficiency of animal based on accumulated feeding times in accordance with some embodiments of the present invention. According to some embodiments of the present invention, each time an animal enters a feeding stall, the animal entering is identified, e.g. by sensing unit 150 (block 310). The feeding trough may be an individual feeding trough for one animal or for a specified animal or a communal feeding trough in which a plurality of animals can feed concurrently.

According to some embodiments of the present invention, time that the identified animal spends at the feeding trough and/or in feeding position is monitored e.g. by sensing unit 150 (block 320). Typically, feeding duration associated with animal identity is communicated to a central computing unit (block 330). According to some embodiments of the present invention, feeding times are accumulated and/or a feeding pattern for an animal is determined (block 340). Typically, each of a plurality of animals is monitored and central computing unit accumulates data for each of the animals monitored. According to some embodiments of the present invention, a quantity of food intake for an animal monitored is determined based on the time the animal spent feeding (block 345). Typically, additional parameters along with time the animal spent feeding is used to determine the quantity of food intake for each animal. For example, one or more of an animal's weight, milk yield, milk composition, days in milking, gender, breed, quantity and/or frequency of water intake, and type of fodder in the feeding stall may be considered when determining quantity of food intake based on time the animal spent feeding. According to some embodiments of the present invention, information regarding output and/or productivity of an animal is monitored and stored in the central computing unit (block 350). According to so some embodiments of the present invention animal efficiency is evaluated based accumulated feeding times and measured animal productivity (block 360). In some exemplary embodiments a look-up table and/or a formula is defined to define animal efficiency based on accumulated feeding times and productivity. Typically, productivity is defined by one or more parameters. Optionally for dairy cows, productivity is defined based on milk yield and/or milk composition. Optionally, productivity is based on body weight or other parameters. In some exemplary embodiments, additional parameters are used to define animal efficiency and/or to define a relationship between quantity of food intake and efficiency. Optionally, parameters including animal breed, type of fodder, season, and/or water intake are measured and used to define a relationship between quantity of food intake and efficiency.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to FIGS. 4A-4H showing exemplary empirical data and correlation between time in the feeding trough (X axis) and weighted food intake in each visit to the feeding trough (Y axis), for eight different cows, which together with the above descriptions illustrate some embodiments of the invention in a non limiting fashion.

Figure 4A:
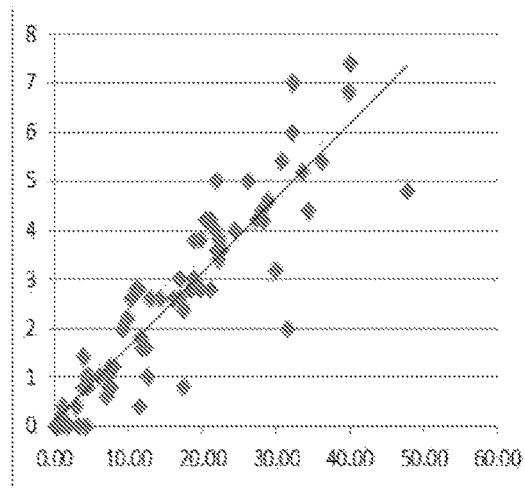
FIGS. 4A-4H showing exemplary empirical data and correlation between time in the feeding trough (X axis) and weighted food intake in each visit to the feeding trough (Y axis), for eight different cows.
Figure 4B:
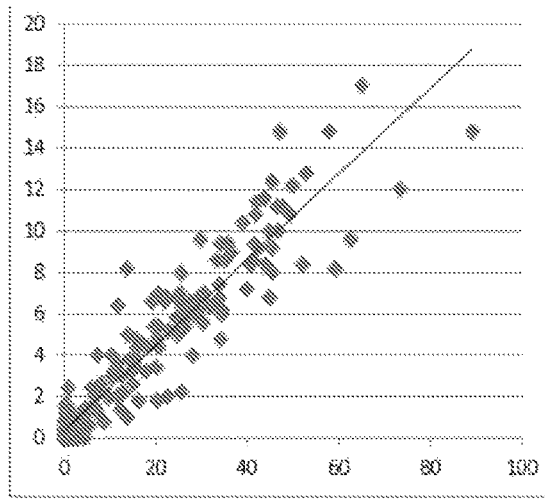
Figure 4C:
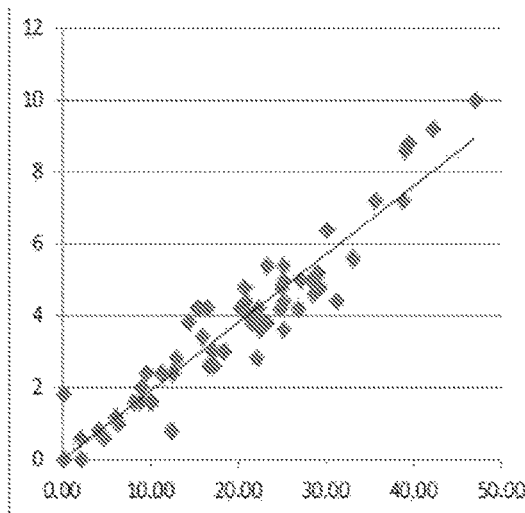
Figure 4D:
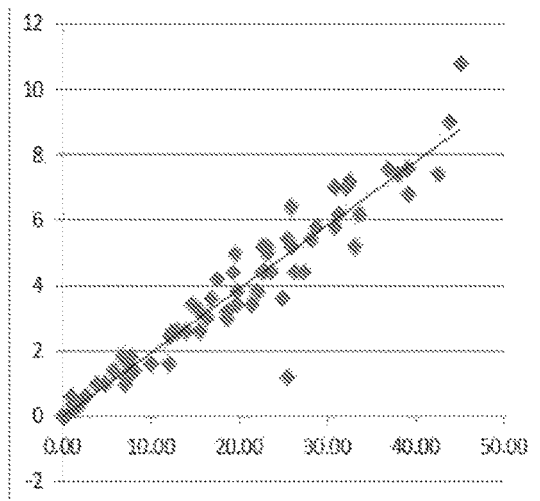

An individual holding tie stall barn with a controlled automatic fodder consumption system was used for the study. Correlation between time in the feeding trough and food intake in each visit to the feeding trough, as measured are presented in FIGS. 4A-4H. The Y axis is the actual feed intake at each feeding session and the X-axis is the feeding time spent at the feeding trough. The present inventors have found that there is a high between time in the feeding trough and food intake. In FIG. 4A, for cow number 2788, a linear relationship between feeding time and food intake was defined by food intake (kg)=0.1518*feeding time (minutes)+0.1069 with $R^2$=0.82 was found. In FIG. 4B, for cow number 2329, a linear relationship between feeding time and food intake was defined by food intake (kg)=0.2065*feeding time (minutes)+0.8879 with $R^2$=0.88 was found. In FIG. 4C for cow number 2318, a linear relationship between feeding time and food intake was defined by food intake (kg)=0.1907*feeding time (minutes)+0.0264 with $R^2$=0.89 was found. In FIG. 4D, for cow number 2628 a linear relationship between feeding time and food intake was defined by food intake (kg)=0.1949*feeding time (minutes)+0.0154 with $R^2$=0.91 was found.

Figure 4E:
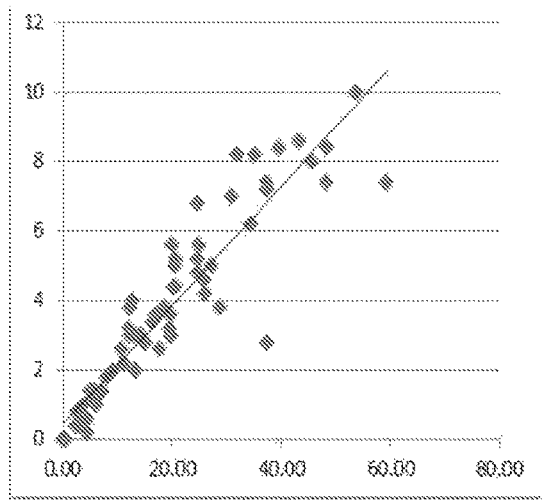
Figure 4F:
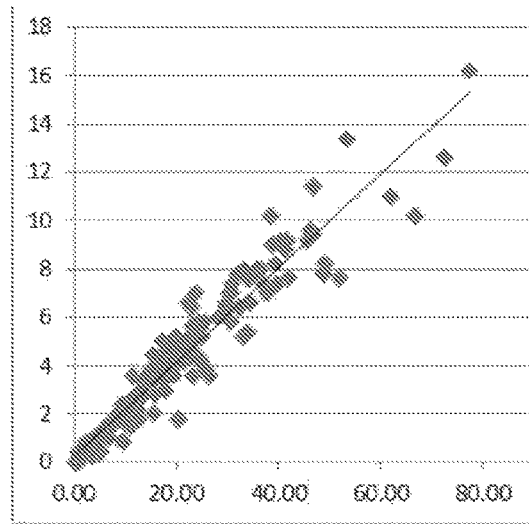
Figure 4G:
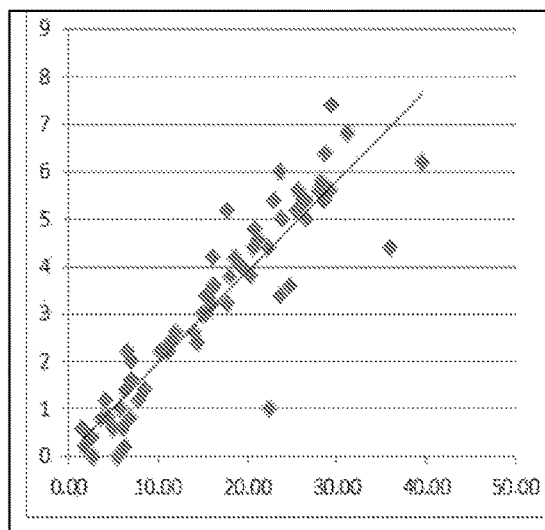
Figure 4H:
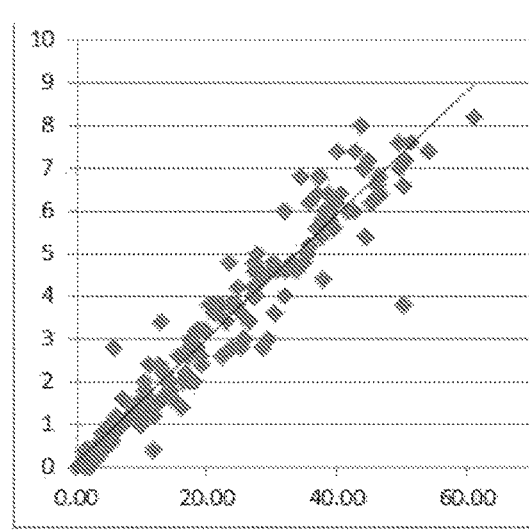

In FIG. 4E, for cow number 2573, a linear relationship between feeding time and food intake was defined by food intake (kg)=0.1709*feeding time (minutes)+0.444 with $R^2$=0.86 was found. In FIG. 4F, for cow number 2534, a linear relationship between feeding time and food intake was defined by food intake (kg)=0.1945*feeding time (minutes)+0.2825 with $R^2$=0.91 was found. In FIG. 4G for cow number 2494, a linear relationship between feeding time and food intake was defined by food intake (kg)=0.1919*feeding time (minutes)+0.0778 with $R^2$=0.83 was found. In FIG. 4H, for cow number 2395 a linear relationship between feeding time and food intake was defined by food intake (kg)=0.1448*feeding time (minutes)+0.0938 with $R^2$=0.91 was found.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for monitoring food intake of livestock animals comprising:
    defining a relationship between time an animal spends at a feeding trough (or time an animal spends in a feeding position at the feeding trough) and the animals food intake during that time;
    monitoring the time an animal spends at the feeding trough (or the time an animal spends in a feeding position at the feeding trough); and
    determining a quantity of food intake for the animal based on the time spent at the feeding trough (or the time spent in a feeding position at the feed trough), days in milking, and the defined relationship.

2. The method according to claim 1, wherein the relationship is defined by one or more lookup tables.

3. The method according to claim 1, wherein the quantity of food intake of the animal is determined without weighing fodder in the feeding trough during feeding.

4. The method according to claim 1, comprising determining the quantity of food intake of the animal based on time the animal spends at the feeding trough (or the time spent in a feeding position at the feed trough) and one or more additional parameters related to the animal, wherein the one or more additional parameters is selected from a group of parameters including the animal's weight, milk yield, milk composition, days in milking, gender, breed, type of fodder in the feeding trough and water intake and wherein water intake is defined as a function of time spent at a water trough.

5. The method according to claim 1, comprising monitoring productivity of the animal and determining animal efficiency based one or more second pre-defined look-up tables or formulas relating feeding time and animal productivity with animal efficiency.

6. The method according to claim 1, wherein the time the animal spends at the feeding trough is monitored by sensing opening and closing of a yoke-gate providing access to the feeding trough.

7. The method according to claim 1, wherein the feeding trough is a communal feeding trough used concurrently by a plurality of animals.

8. The method according to claim 1, wherein the quantity of food intake is determined based on accumulated recorded times the animal spends at the feeding trough.

9. The method according to claim 1, wherein the quantity of food intake is determined concurrently for a plurality of animals by concurrently monitoring times that each of the plurality of animals spends at a feeding trough.

10. A system for monitoring food intake of livestock animals comprising:
   a sensing unit configured for sensing time the animal spends at a feeding trough (or time the animal spends in a feeding position at the feed trough) and for identifying the animal;
   a computing unit storing one or more pre-defined look-up tables or formulas relating quantity of food intake of the animal to time spent at the feeding trough and days in milking of the animal, wherein the computing unit is configured for receiving input from the sensing unit and determining the quantity of food intake of the animal responsive to the time spent at the feeding trough (or time the animal spent in a feeding position at the feed trough) using the one or more pre-defined look-up tables or the formulas, wherein input from the sensing unit includes days in milking of the animal; and
   a user interface configured for reporting the animal's quantity of food intake.

11. The system according to claim 10, wherein the sensing unit includes a plurality of sensors.

12. The system according to claim 10, wherein the sensing unit includes a camera for imaging or scanning an identity code on an identification tag fixed to an animal.

13. The system according to claim 10, wherein the sensing unit includes an RFID reader for interrogating an identification tag fixed to the animal.

14. The system according to claim 10, wherein the sensing unit is configured for sensing opening and closing of a yoke-gate through which the animal obtains access to the feeding trough and wherein the time the animal spends at the feeding trough (or the time the animal spends in a feeding position at the feeding trough) is defined by the duration between opening and closing of the yoke-gate by the animal.

15. The system according to claim 10, wherein the sensing unit includes a microphone for sensing when the animal is eating based on sound.

16. The system according to claim 10, wherein the sensing unit is operable to sense time the animal spends at a water stall.

17. The system according to claim 10, wherein the computing unit is operable to receive additional input associated with the animal and to determine the quantity of food intake of the animal responsive to the time the animal spent at the feeding trough and the additional input using the one or more pre-defined look-up tables or the formulas.

18. The system according to claim 17, wherein the additional input is selected from a group of parameters including: animal weight, milk yield, milk composition, animal gender, breed, type of fodder in the feeding trough, and water intake.

19. The system according to claim 10, wherein the computing unit stores one or more pre-defined second look-up tables or second formulas relating quantity of food intake of the animal to animal efficiency score.

20. The system according to claim 10, wherein the animal is a cow.

* * * * *